United States Patent [19]

Beck et al.

[11] Patent Number: 4,913,971

[45] Date of Patent: Apr. 3, 1990

[54] ADHESIVE MIXTURE

[75] Inventors: Manfred Beck, Wipperfuerth; Horst Müller-Albrecht, Cologne; Heinrich Königshofen, Bergisch-Gladbach, all of Fed. Rep. of Germany

[73] Assignee: Bayer Aktiengesellschaft, Leverkusen, Fed. Rep. of Germany

[21] Appl. No.: 346,385

[22] Filed: Apr. 27, 1989

Related U.S. Application Data

[63] Continuation of Ser. No. 139,733, Dec. 30, 1987, abandoned.

[30] Foreign Application Priority Data

Jan. 6, 1987 [DE] Fed. Rep. of Germany ....... 3700194
Jan. 28, 1987 [DE] Fed. Rep. of Germany ....... 3702394

[51] Int. Cl.$^4$ .................. C08L 75/04; B32B 27/40
[52] U.S. Cl. ......................... 428/424.8; 428/423.1; 428/423.4; 428/423.9; 525/89; 525/92; 525/125
[58] Field of Search .................. 525/92, 125, 129, 130, 525/89; 428/423.1, 423.4, 423.9, 424.8

[56] References Cited

U.S. PATENT DOCUMENTS 3,917,742 11/1975 Harlan ................................ 525/92
3,970,717 7/1976 Albrecht ........................... 525/130

*Primary Examiner*—John C. Bleutge
*Assistant Examiner*—David Buttner
*Attorney, Agent, or Firm*—Connolly and Hutz

[57] ABSTRACT

Mixtures of
(A) from 20 to 99 parts by weight of a soluble polyurethane,
(B) up to 50 parts by weight of an aromatic vinyl compound/diene block polymer,
(C) from 0.5 to 50 parts by weight of a modified aromatic vinyl compound/diene polymer and
(D) from 0 to 10 parts by weight of a polyisocyanate, optionally dissolved in an organic solvent, have proved to be excellent adhesives.

6 Claims, No Drawings

ADHESIVE MIXTURE

This application is a continuation, of application Ser. No. 139,733, filed Dec. 30, 1987, now abandoned.

In many cases, the bonding of rubber soles with polyurethane adhesives produces unsatisfactory adhesion values without special pretreatment. Accordingly, numerous proposals have been made with a view to improving adhesion. Thus, according to GB-PS 1 500 296, the tread surface of soles is coated with solutions of N-halogen compounds (so-called primers) before application of the adhesive. Soles pretreated in this way are characterized by good adhesion values where polyurethane (PU) adhesives are used. The disadvantage is that an additional step is required before the bonding process. It is also known that N-halogen compounds can be reacted with the adhesive or mixtures thereof may be used as primer (GB-PS 1 293 842). However, the above-mentioned disadvantages again apply. GB-PS 2 048 897 describes another primer in the form of a reaction product of an N-halogen compound and an SBS block polymer ("SBS"). In this case, too, freshly prepared primer solutions still contain N-halogen compound, besides which the need for an additional process step still remains. Accordingly, there is still a need for an adhesive which is suitable for bonding soles, particularly of thermoplastic rubbers of the SBS type or similar products, without any need to use a primer. On account of their apolar structure, these sole materials are unable to develop adequate adhesive forces wioth respect to PU adhesives. The present invention relates to mixtures suitable as adhesives of (A) from 20 to 99, preferably from 60 to 95, particularly from 70 to 90, parts by weight of a polyurethane, (B) up to 50, preferably from 0.5 to 30, particularly from 5 to 20, parts by weight of an aromatic vinyl compound/diene block polymer, (C) from 0.5 to 50, particularly from 5 to 30, parts by weight of a modified aromatic vinyl compound/diene polymer and (D) from 0 to 10 parts by weight of a polyisocyanate.

As adhesives, these mixtures are present in solvents. In the absence of a primer, they bond SBS block polymers (for example as sole material) to one another and to other polymers with good initial and final adhesion values. Mixtures of polyurethane adhesives with styrene/butadiene block polymers alone do not produce useful bonds. While freshly prepared mixtures of polyurethane adhesive and the styrene/butadiene block polymer, for example in methylethylketone, initially appear uniformly cloudy, two phases begin to develop after a few hours, their respective volumes being dependent on the mixing ratio between the components. By contrast, mixtures of polyurethane (PU) and a partially modified SBS in a solvent represent clear solutions which remain unchanged for several months, but which have been found to produce unsatisfactory adhesion values. If the modified SBS is added to the above-described unstable two-component mixture of PU and SBS, cloudy, but permanently stable mixtures are surprisingly obtained. The clouding is caused by very small, uniformly distributed particles without any tendency towards sedimentation. Three-component mixtures such as these remain stable for several months and meet the need for a non-sedimenting adhesive which produces high adhesion values. The same result is achieved by using a highly modified SBS (i.e. a mixture from A and C), wherein component C is such structured that at least 1.5 mol, preferably 1.8 to 2.3 mol of modifier have been used per mol of butadiene unit.

Component (A) according to the invention consists, for example, of substantially linear, soluble or fusible polyurethanes containing terminal hydroxyl groups. The use of materials such as these for bonding various substrates is known. Their production is described, for example in DE-PS 1 256 822, 1 930 336 or 2 161 340. The polyurethanes in question may be synthesized from crystalline dihydroxypolyesters having a molecular weight of from 800 to 4000 using chain-extending agents and diisocyanates. Polyester polyurethanes in which the polyester component consists of a mixture of various alcohols (DE-OS 3 502 379) are equally suitable. Polyurethanes such as these show favorable heat activation behaviour. Full particulars of polyester components and their quantitative ratios, of the diol components and of the diisocyanate components can be found in the above-mentioned patents, incorporated herein by reference. However, the composition of component (A) in the present mixtures is not confined to the polyurethanes mentioned. Instead, it is also possible to use reaction products containing polyether diols or polyether ester diols with polyisocyanates. Analogous polyurethanes, of which the polyester component is a polycarbonate or in which polycarbonate groups are present in addition to carboxylic acid ester groups, may also be used. It is also possible to use polyesters in which the acid component is a mixture of various carboxylic acids. In addition to polyesters based on $C_4$ diols, it is also possible to use polyesters based on $C_2$ and/or $C_3$ diols or mixtures thereof with $C_4$ diols.

Preference is attributed to the process products according to DE-PS 1 256 822, 1 930 336 and 2 161 430 and to the process products according to DE-OS 3 502 379.

The polyurethanes A in general have a viscosity (15% by weight strength in methyl ethyl ketone) of from 0.1 to 4, preferably from 0.2 to 2, Pa.s (Brookfield viscometer, spindle 3, 60 rpm, 23° C.).

The block polymers (B) contain at least one block of polymerized aromatic vinyl compounds, such as styrene, vinyl toluene, α-methyl styrene, vinyl naphthalene and, in certain cases, also small quantities of divinyl compounds, such as divinylbenzene. Styrene and α-methyl styrene are preferred, styrene being particularly preferred. The polymer of these monomers forms the so-called hard block (also referred to as "S" for styrene).

The diene block preferably contains as polymerized dienes $C_4$–$C_6$ 1,3-dienes, such as 1,3-butadiene, isoprene, 2,3-dimethyl-1,3-butadiene. Butadiene and isoprene are preferred, butadiene being particularly preferred. Accordingly, the diene block is also referred to as "B" (for butadiene). The diene block is the so-called soft block.

The block polymers B comprise, on an average, from 4 to 500, preferably from 100 to 250 S units and from 10 to 4000, preferably from 100 to 1000 B units per molecule. The S content is generally from 10 to 95, preferably from 40 to 90, % by weight, based on B. The block polymers B preferably have an intrinsic viscosity of from 0.3 to 3, particularly from 0.5 to 1.8, dl/g (determined at a concentration of 5 g/l toluene at 25° C.).

The block polymers may be prepared in known manner by anionic polymerization in liquid hydrocarbons as solvent. The structure of the block polymers obtainable in this way may vary widely. In the most simple case, the block polymer in question is a block polymer of the S-B type. A modification of block polymers such as these are the block polymers containing transition blocks (tapered structures) symbolized by S-SB-B, where SB is a block changing continuously in its composition from "rich in styrene" to "rich in butadiene". They are formed during the simultaneous polymerization of both monomers. The coupling of living block polymers can produce structures of the S-B-S type or, using polyfunctional couplers, structures of the $(SB)_nC$ type, where C is the coupler molecule and n is its coupling valency. It is also possible to produce block polymers by alternate addition of monomers, in which case block polymers of the $(SB)_n$-S type are formed. It is also possible to produce polymers terminated by diene blocks. Other structures may be obtained by alternate combination of the separate and combined addition of the monomers. It is also known to the expert that the structure of the block polymers (vinyl content of the diene component, random distribution of the monomers) may be influenced through the choice of the reaction temperature and the solvent. In addition, additional branches may be incorporated by addition of small quantities of divinylbenzene. Another variable is the quantitative ratio of the monomers.

It is also possible to use monomer mixtures to synthesize the hard and soft blocks, for example styrene and α-methyl styrene or butadiene and isoprene; the polymers of these monomers may represent separate blocks.

Other types which may be used in particular for the preparation of the modified component (C) described below are styrene-grafted SB block polymers.

The modified aromatic vinyl compound/diene polymer (C) may be obtained by a halogenation reaction involving the polybutadiene component of an aromatic vinyl compound/diene polymer, hereinafter also referred to as S/B copolymer. Suitable polymers for the modification are any of the block polymers mentioned above in regard to (B). It is also possible to use random aromatic vinyl compound/diene copolymers. Halogenation reactions are to be understood to be the reactions which may be carried out at olefinically unsaturated groups or at allyl groups and which lead to the introduction of halogen and, optionally, OH or =O. These processes are known and include, for example, halogenation with elemental halogen, preferably chlorine, alkoxychlorination by the combined action of chlorine in the presence of alcohols, hydroxyhalogenation with alkali metal hypohalite, and the reaction with organic hypochlorites, for example tert.-butyl hypochlorite, which leads to the formation of chlorohydrins. Another method is to use N-halogen compounds such as N,N-dichlorodimethyl hydantoin, trichloroisocyanuric acid, dichloroglycoluril, chloramine T, sodium dichloroisocyanurate, N-bromosuccinimide. The reaction of dichlorocarbenes with the double bonds of the butadiene units may also be used. The products obtained may be characterized by their halogen content.

With regard to component C, "modified" according to the invention generally means a modification using from 0.03 to 2.3 mols of modifier per mol of butadiene units.

The lower limit to the halogen content is generally at around 1% by weight. The upper limit is determined by the diene content of the S-B polymer. It is reached when the double bonds are completely saturated. The halogen content actually reached depends upon the type of halogenation reaction (for example chlorination, hydroxychlorination, dichlorocarbenylation). In certain cases, allyl-positioned H-atoms may even be additionally replaced by halogen or, after eliminiation of HCl, new double bonds formed may be rechlorinated. The products may additionally contain relatively small numbers of carbonyl groups as a result of oxidative processes.

The mixtures of components A, B and C may be used both in undiluted form and also diluted with a solvent or swelling agent. In the former case, the mixtures may be applied from the melt whereas, in the latter case, the mixtures are preferably applied by application of the solution and evaporation of the solvent. Suitable solvents are low-boiling liquids, preferably aromatic and cycloaliphatic hydrocarbons and alcohols and, more preferably, ketones such as butanone and acetone, esters such as ethyl acetate, methylene chloride and toluene. In many cases, mixtures of the above-mentioned solvents are particularly favorable.

The solution of the mixtures according to the invention in the solvents may be prepared in the usual way, the order in which the constituents have to be dissolved being easy to determine by preliminary tests. The mixtures according to the invention may contain the usual stabilizers, for example a phenolic antioxidant to stabilize component B and stabilizers against dehydrohalogenation, such as epoxides, for component C.

In addition, the mixtures may contain fillers, dyes and other polymers. To obtain particular properties, natural or synthetic resins, such as phenolic resins, ketone resins, colophony derivatives, phthalate resins, acetyl cellulose or nitrocellulose, may be added to the mixtures.

Polyisocyanates may optionally be added as component (C) to the mixtures of components A-C shortly before use in order to improve the thermal stability of the bonds. Typical examples of polyisocyanates are diisocyanates and triisocyanates. It is preferred to add triisocyanates, for example triphenylmethane triisocyanate or thiophosphoric acid tris-(p-isocyanatophenyl ester).

DESCRIPTION OF THE ADHESIVE COMPONENTS

The components of the mixtures are characterized below:

PU 1: weakly crystallizing polyester polyurethane of high thermoplasticity. Solution viscosity in methyl ethyl ketone (MEK, 15% by weight)=0.2±0.1 Pa.s (Brookfield, spindle 3, 60 rpm, 23° C.) (®Desmocoll 110, a product of Bayer AG).

PU 2: strongly crystallizing polyester polyurethane of high thermoplasticity. Solution viscosity (in MEK; 15 % by weight): 0.6±0.2 Pa.s (®Desmocoll 400).

PU 3: very strongly crystallizing polyester polyurethane of average thermoplasticity. Solution viscosity (in MEK; 15% by weight): 1.2±0.2 Pa.s (®Desmocoll 510 S).

PU 4: very strongly crystallizing polyester polyurethane of low thermoplasticity. Solution viscosity (in MEK; 15% by weight): 1.2±0.2 Pa.s (®Desmocoll 530).

PU 5: highly crystalline polyester polyurethane of an average thermoplasticity. Solution viscosity (in MEK; 15% by weight): 1.8±0.3 Pa.s (®Desmocoll 540).

SB 1: Styrene/butadiene block polymer of the SBS type, butadiene content 64% by weight, intrinsic viscosity $[\pi]=79$ cm$^3$/g in dichloromethane (®Clariflex 1102, a product of Shell).

SB 2: Styrene/butadiene block polymer of the SBS type with transition blocks ("tapered structure") and a butadiene content of 25% by weight; Intrinsic viscosity $[\eta]=80$ cm/g in toluene (®Stereon 872 A, a product of Firestone).

SB 3: SB block polymer containing 20% by weight of butadiene, $T_g$-80° C., melt flow index (10 kg/200° C.)=87° C., Vicat B=56° C., (®Styrolux, a product of BASF).

Polyisocyanate A: Thiophosphoric acid-tris-(p-isocyanatophenyl ester), solution in methylene chloride, NCO content 5.4±0.2% by weight.

Bonding procedure

Using the 20% by weight adhesive solutions described below, flexible PVC (45% by weight dioctylphthalate) was bonded to a filled sole material based on styrene/butadiene block polymers. After application to 15×3 cm strips, both sides were left to air for 30 minutes, after which the sample with the thermoplastic rubber was shock-activated for 4 seconds using an IR emitter (Funck type A 1000 activator).

Immediately afterwards, the test specimens were placed on top of one another and then pressed for 10 seconds in a press at room temperature under a pressure of 0.4 MPa.

Immediately afterwards (within 30 seconds), the first test for peel strength was carried out in a tensile testing machine (immediate value, cross-head speed 100 mm/minute). Another test was conducted after 1 day and a further test after 9 days. In a modified procedure, 5 phr polyisocyanate A were added to the solution immediately before application of the adhesive. The results are characterized in each case by "without" or "with isocyanate".

EXAMPLE A

Modified (halogenated) styrene/butadiene block polymer 300 g SB 2 were dissolved in 2600 ml methylene chloride, 120 g chlorine gas were introduced over a period of 5 hours at 40° C. The solution of the modified block polymer was worked up either by precipitation with methanol or by stripping (adding the solution dropwise to hot water). For stabilization, an epoxide stabilizer was added beforehand. Chlorine content 21–23% by weight.

EXAMPLE B

Modification of SB 2 with sodium hypochlorite solution 40 g SB 2 were dissolved while stirring in 360 ml methylene chloride. 0.5 g of a phase transfer catalyst were added, followed by the dropwise addition of 50 g of a 15% by weight aqueous sodium hypochlorite solution. 1.5 ml triethylene were then added. The mixture was heated to 40° C. and left to react for 4 hours with stirring. The organic solution was stripped with steam and the product precipitated was dried in vacuo at 60° C. Chlorine content 1.9% by weight.

EXAMPLE C 1 g tricaprylyl methyl ammonium chloride was added to a 7.4% by weight solution of SB 2 in chloroform containing 30 g SB 2, followed by the dropwise addition at a maximum temperature of 50° C. of 80 ml of a 50% by weight aqueous KOH solution. The organic phase was then extracted twice by shaking with distilled water, after which the polymer was precipitated by pouring into methanol. After dissolution and reprecipitation once more, the product showed a chlorine content of 9.9% by weight.

EXAMPLE D 20 g SB 2 were dissolved in 335 g methyl ethyl ketone. A solution of 5 g trichloroisocyanuric acid in 45 g methyl ethyl ketone was added dropwise with stirring at room temperature to the resulting solution. After 5 hours, the solution, which contained numerous small gel particles, was used for the preparation of an adhesive solution.

EXAMPLE E 8 g SB 2 and 1.0 g p-toluene sulfonic acid amide were dissolved in 280 g methyl ethyl ketone. 2.0 g trichloroisocyanuric acid dissolved in 40 g methyl ethyl ketone were slowly added dropwise to the resulting solution at room temperature. After stirring for 5 hours, the modified SBS was used for the preparation of an adhesive mixture.

EXAMPLE F 12.6 g trichloroisocyanuric acid in 40 ml methyl ethyl ketone were slowly added dropwise with stirring at room temperature to a solution of 15 g PU 3 in 85 g methyl ethyl ketone. 10.8 g of the solution obtained were run into a solution of 4 g SB 2 in 195 ml methyl ethyl ketone. After heating for 5 hours at 30° to 40° C., the modified SBS was used for the preparation of an adhesive. After isolation of the reaction products, it was shown by IR spectrum that an N-chlorine compound is formed from PU 3 in the first stage, chlorinating the SB 2. A mixture of PU 3 and modified SBS is thus obtained.

EXAMPLE G 10 g chlorine gas were introduced over a period of 30 minutes at 40° C. into a solution of 30 g SB 3 in 345 g methylene chloride. The system was purged with nitrogen, 0.3 g of the diglycidyl ether of bisphenol A was added and the product was precipitated by running the solution into methanol. Drying in vacuo at 50° C., chlorine content 21.8% by weight.

EXAMPLE 1

80 parts by weight PU 3, 10 parts by weight SB 1 and 10 parts by weight of the modified S/B polymer prepared in accordance with Example A were dissolved in such a quantity of methyl ethyl ketone (MEK) that a mixture having a solids content of 20% by weight was formed. Mixtures were similarly prepared in accordance with the data of Table 1 and used to bond PVC to the thermoplastic sole material. The results of the peel strength tests are set out in Table 1. For comparison, bonding was carried out with 100% PU 3, with mixtures of PU 3 plus SB 1 and with mixtures of PU 3 plus modified S/B polymer according to Example A. The results clearly show that, both in regard to immediate strength and in regard to ultimate strength, only the claimed mixtures give the values stipulated by the DIN standard (immediate: >1, after 9 days: >5 N/mm).

TABLE 1

Peel strengths of two-component and three-component mixtures based on PU 3. Substrate PVC against TR sole material

| Component[1] | | | Peel strength (N/mm) | | | | | |
| --- | --- | --- | --- | --- | --- | --- | --- | --- |
| | | | without isocyanate | | | with isocyanate | | |
| A | B | C | immediate | 1 day | 9 days | immediate | 1 day | 9 days |
| A | 50 | 30 | 20 | 1.0 | 3.2 | 4.0 | 1.2 | 4.6 | 5.3 |
| B | 80 | 10 | 10 | 1.7 | 5.3 | 6.0 | 1.7 | 6.0 | 6.0 |
| C | 90 | 5 | 5 | 1.9 | 4.3 | 5.0 | 1.5 | 4.7 | 5.6 |
| D | 95 | 2.5 | 2.5 | 1.1 | 3.8 | 4.9 | 1.1 | 4.1 | 5.0 |
| E | 100 | — | — | 0.2 | 0.4 | 0.5 | 0.8 | 0.5 | 0.5 |
| F | 95 | 5 | — | 1.0 | 0.4 | 0.7 | 1.2 | 1.2 | 1.8 |
| G | 90 | 10 | — | 0.5 | 0.8 | 1.8 | 0.5 | 0.7 | 3.7 |
| H | 85 | 15 | — | 0.4 | 0.4 | 1.0 | 0.3 | 0.5 | 0.7 |
| J | 70 | — | 30 | 1.4 | 2.1 | 2.4 | 1.4 | 1.7 | 1.5 |
| K | 80 | — | 20 | 1.4 | 1.7 | 2.4 | 1.2 | 2.4 | 2.6 |
| L | 90 | — | 10 | 1.4 | 2.1 | 2.0 | 1.6 | 2.6 | 3.0 |

[1]A = PU 3; B = modified SB according to Example A; C = SB 1

Stability of the mixture in storage (solvent methyl ethyl ketone).

The claimed mixtures remain stable for months. They are cloudy-looking two-phase systems which permanently contain finely divided particles with no tendency towards sedimentation. Mixtures of components A and B appear clear as solutions and show no signs of separation.

EXAMPLE 2

Variation of the polyurethane component shows that the principle of the three-component mixture may be widely applied. It is possible to use both intensively crystallizing, high-viscosity polyester polyurethanes differing in their thermoplasticity and also those of low solution viscosity. The results are summarized in Table 2.

TABLE 2

| | Component[2] | | Peel strength | | | | | |
| --- | --- | --- | --- | --- | --- | --- | --- | --- |
| | | | without isocyanate | | | with isocyanate | | |
| PU[1] | B | C | immediate | 1 day | 9 days | immediate | 1 day | 9 days |
| PU 2 | 10 | 10 | 0.9 | 4.8 | 5.2 | 0.9 | 3.8 | 5.0 |
| PU 3 | 10 | 10 | 2.0 | 5.3 | 6.0 | 2.6 | 5.1 | 5.7 |
| PU 4 | 10 | 10 | 2.8 | 4.2 | 5.3 | 2.9 | 4.5 | 7.5 |
| PU 5 | 10 | 10 | 1.8 | 3.7 | 4.1 | 2.2 | 4.9 | 5.2 |

[1]80 parts by weight
[2]C = modified SB polymer prepared in accordance with Example A
B = SB 1

EXAMPLE 3 (Comparison)

For comparison, the halogenated polymers shown below were studied as modified polymers. To this end, 80 parts by weight PU 3, 10 parts by weight SB 1 and 10 parts by weight of each of the polymers indicated in Table 3 were dissolved in methylethylketone to form a 20% by weight adhesive solution. The results show that none of these polymers is comparable with the modified S/B polymers.

TABLE 3

Adhesive mixtures using other halogenated polymers

| Halogenated polymer[1] | Peel strength (N/mm) with isocyanate | | |
| --- | --- | --- | --- |
| | immediate | 1 day | 9 days |
| Pergut S 10 | 1.3 | 2.1 | 2.3 |
| Pergut S 40 | 0.7 | 2.8 | 2.9 |
| Pergut S 90 | 0.8 | 2.2 | 2.2 |
| Hypalon 40 | 0.3 | 1.7 | 1.9 |
| Bayer CM 4230 | 0.4 | 1.1 | 1.4 |
| Baypren 210 | 0.5 | 1.3 | 1.5 |

TABLE 3-continued

Adhesive mixtures using other halogenated polymers

| Halogenated polymer[1] | Peel strength (N/mm) with isocyanate | | |
| --- | --- | --- | --- |
| | immediate | 1 day | 9 days |
| Baypren, mod.[2] | 0.3 | 1.0 | 1.4 |

[1]Adhesive mixture: 80 parts by weight PU 3, 10 parts by weight SB 1 and 10 parts by weight halogenated polymer. Solids content: 20% by weight.
[2] ®Baypren 210 chlorinated in the presence of ethanol, content of chlorine = 44.9% by weight.

EXAMPLE 4

This Example is intended to show that other polymers may also be added to the three-component mixture of polyurethane, SBS block polymer and modified SB polymer. For example, a mixture of 80 parts by weight PU 3, 7.5 parts by weight SB 1, 7.5 parts by weight chlorinated SB 2 (Cl content 23.0% by weight) and 5 parts by weight ®Plexigum M 319 (a copolymer of methyl and ethyl methacrylate) gives immediate values of 2.0 N/mm and ultimate values (9 days) of 6.6 N/mm (with addition of isocyanate). A similar mixture of 75, 10, 10 and 5 parts by weight of the same components gave an immediate value of 1.0 N/mm. Without isocyanate, the ultimate value was 5.0 N/mm.

EXAMPLE 5

An adhesive mixture was prepared from 50 parts by weight PU 3, 20 parts by weight SB 2 and 30 parts by weight of a chlorinated SB polymer (chlorine conent=1.9% by weight) prepared in accordance with Example B using aqueous hypochlorite solution. The peel strengths were as follows:

|  | with isocyanate | | |
| --- | --- | --- | --- |
| immediate | 1 day | | 9 days |
| 1.3 | 3.5 | | 4.8 |

The results show that a modified SBS polymer of very low chlorine content also gives a useful adhesive mixture. The Example also shows that other unmodified SB block polymers than SB 1 may also be used. Where SB 1 is a linear polymer of the SBS type with sharp transitions between blocks, transition blocks of varying composition (tapered blocks) are present between the styrene and the butadiene blocks in SB 2, in addition to which the styrene content of SB 2 is distinctly higher than in SB 1 (75% as against 33%).

EXAMPLE 6

20% by weight solutions in butanone were prepared from 10 parts by weight (solids) of the modified SBS block polymers obtained in accordance with Examples D and E with addition of PU 3 (80 parts by weight) and SB 1 (10 parts by weight). Bonds were prepared in the same way as in Example 1. The peel strengths of bonds of the present mixture satisfy the requirements of the DIN standard (Table 4).

|  | mod. SBS according to Example | With isocyanate | | |
| --- | --- | --- | --- | --- |
|  |  | immediate | 1 day | 9 days |
| 6 A | D | 1.8 | 4.2 | 5.0 |
| 6 B | E | 1.1 | 4.0 | 5.9 |

EXAMPLE 7

32 g PU 3 and 4 g SB 1 were added to the solution obtained in accordance with Example F and dissolved while stirring. The 20% by weight solution was used for bonding in the same way as in Example 1.

| Peel strength (N/mm) | Immediate | 1 day | 9 days |
| --- | --- | --- | --- |
|  | 1.0 | 2.5 | 4.4 |

EXAMPLES 8 A–C (Comparison

These Examples show that the modified SBS polymers used solely as primers do not give useful bonds (8 A). Mixtures of a modified SBS polymer with SB 1 (ratio 1:1) used as primer also gave negative result (8B). Finally, unmodified SBS was included in the study as a comparison primer (8 C).

Bond strengths of bonds with PU 3 solution on TR sole surfaces against PVC after priming with the above-mentioned

|  |  | Peel strength with isocyanate | | |
| --- | --- | --- | --- | --- |
| Example | Primer[1] | immediate | 1 day | 9 days |
| 8 A | mod. SBS acc. to Example A | 0.8 | 0.8 | 3.8 |
| 8 B | mixture SB 1/SBS acc. Example A (1:1) | 0.6 | 1.6 | 3.4 |
| 8 C | SB 2 | 0.7 | 0.4 | 3.6 |

[1]Primer coating 1 hour old

EXAMPLE 9

Mixture of 80 parts by weight PU 3, 10 parts by weight SB 1 and 10 parts by weight of the modified S/B polymer prepared in accordance with Example G in MEK were prepared as in Example 1. The peel strengths were as follows:

|  | Without isocyanate | | | With isocyanate | | |
| --- | --- | --- | --- | --- | --- | --- |
| Example | immediate | 1 day | 9 days | immediate | 1 day | 9 days |
| 9 | 2.3 | 3.8 | 5.0 | 2.0 | 6.2 | 6.7 |

We claim:
1. Mixtures of
   (A) from 20 to 99 parts by weight of a polyurethane,
   (B) from 0.5 to 50 parts by weight of an non-halogenated aromatic vinyl compound/diene block polymer,
   (C) from 0.5 to 50 parts by weight of a halogen modified aromatic vinyl compound/diene polymer and
   (D) from 0 to 10 parts by weight of a polyisocyanate optionally dissolved in an organic solvent.
2. Mixtures as claimed in claim 1, in which component C is a polymer obtained by chlorination of a styrene/butadiene block polymer.
3. Rubber, leather or plastic articles bonded to a substrate by the mixture according to claim 1.
4. The articles according to claim 3 wherein the substrate is styrene/butadiene block polymer.
5. The articles according to claim 3 wherein said mixture contains a polyisocyanate.
6. Rubber, leather or plastic articles coated with the mixture according to claim 1.

* * * * *